United States Patent [19]

Wood et al.

[11] Patent Number: 4,799,172

[45] Date of Patent: Jan. 17, 1989

[54] APPARATUS AND METHOD FOR AUTOMATIC LAYOUT OF SIGN TEXT

[75] Inventors: Kenneth O. Wood, Ellington; David J. Logan, Glastonbury, both of Conn.

[73] Assignee: Gerber Scientific Products, Inc., Manchester, Conn.

[21] Appl. No.: 857,849

[22] Filed: Apr. 30, 1986

[51] Int. Cl.⁴ ............................................. G01D 9/38
[52] U.S. Cl. .................................. 364/518; 364/519; 400/76
[58] Field of Search ..................... 364/518, 519, 521; 400/119, 76; 340/703, 728, 724, 798, 799; 101/93.04; 382/56

[56] References Cited

U.S. PATENT DOCUMENTS

| | | | |
|---|---|---|---|
| 4,225,249 | 9/1980 | Kettler et al. | 400/76 X |
| 4,408,200 | 10/1983 | Bradley | 340/799 X |
| 4,603,396 | 7/1986 | Washizuka et al. | 364/518 X |
| 4,642,622 | 2/1987 | Ito et al. | 340/750 X |
| 4,677,571 | 6/1987 | Riseman et al. | 364/519 |
| 4,679,153 | 7/1987 | Robinson et al. | 364/523 |
| 4,694,405 | 9/1987 | Bradbury et al. | 364/518 |

Primary Examiner—Gary V. Harkcom
Assistant Examiner—H. R. Herndon
Attorney, Agent, or Firm—McCormick, Paulding & Huber

[57] ABSTRACT

An apparatus and method for laying out a sign containing a plurality of lines of text performs and comprises the steps of entering into a computer information defining the sign text and the heights of the lines of text, providing a spatial factor which corresponds to a related level of openness of the sign, and positioning the lines of text relative to each other to yield balanced spacings between the lines which are a function of the spatial factor and one or more of the line heights. Provision for top, bottom and side margins may also be provided. The layed-out sign may be displayed or plotted and, if it is not satisfactory, the operator may select another spatial factor to provide another lay-out of differing openness.

26 Claims, 5 Drawing Sheets

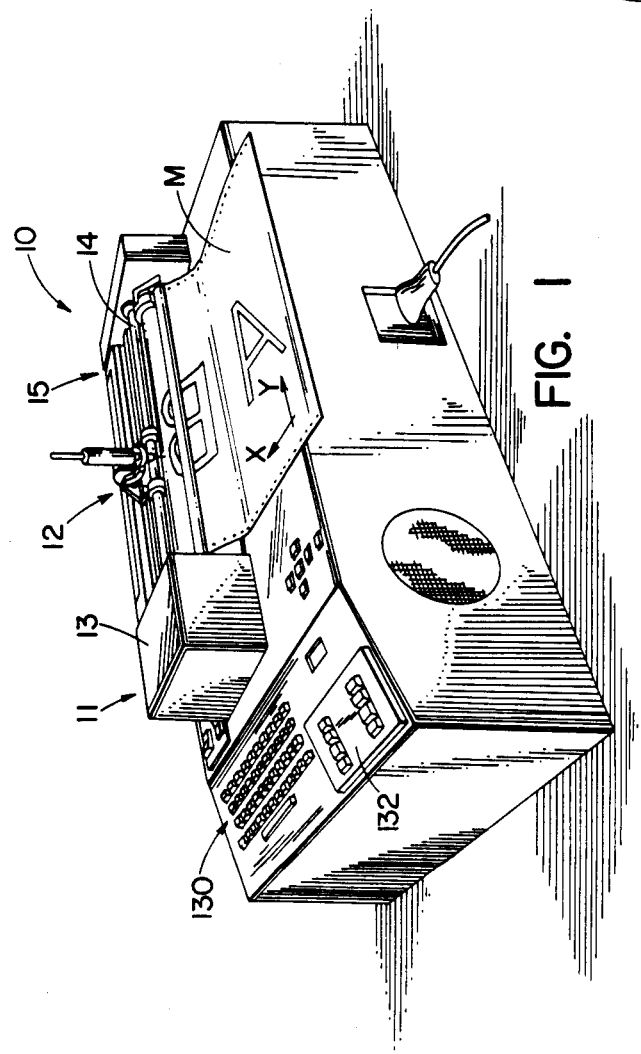
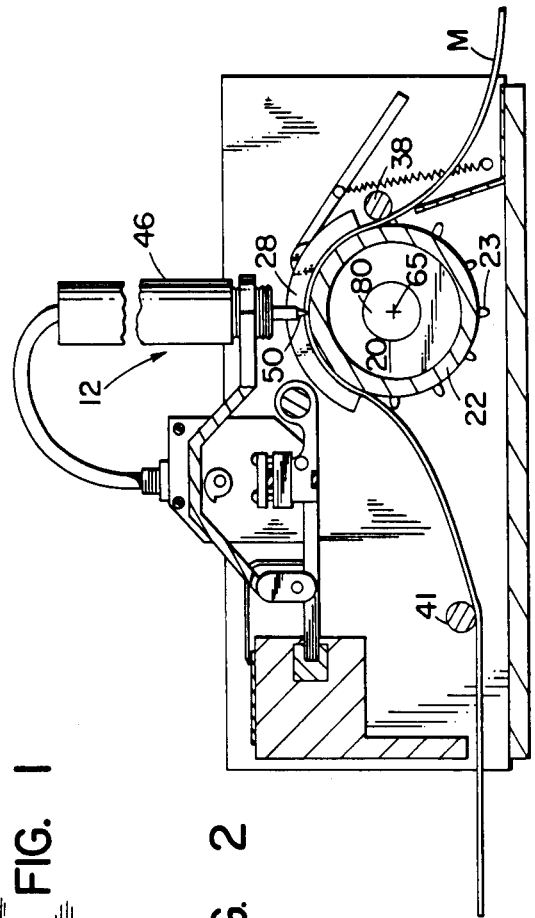
FIG. 1
FIG. 2

APPARATUS AND METHOD FOR AUTOMATIC LAYOUT OF SIGN TEXT

BACKGROUND OF THE INVENTION

The invention relates generally to sign making apparatus and processes and deals more particularly with a microprocessor based sign making apparatus and method to determine an aesthetically pleasing spacing between lines of text in a sign, and, if wanted, a balanced, aesthetically pleasing margin to surround the sign text, based on text line heights and other parameters selected by an operator. The invention also relates to such an apparatus and method including provision to instantaneously vary the spacing between lines of text and the margin sizes in a balanced fashion at the touch of a button according to the desire of an operator to provide a more open or tighter appearing sign.

A sign maker is disclosed in U.S. Pat. No. 4,467,525 to Logan and Sullivan, which patent issued on Aug. 28, 1984, is assigned to the assignee of the present invention and is hereby incorporated by reference as part of the present disclosure. The sign maker disclosed in the patent comprises a web feeding apparatus, a tool to selectively plot sign characters on or cut sign characters from a web, and a computer programmed to direct the cutting and plotting operations according to data input by an operator. During such data entry, the operator specifies a font (type style), one or more lines of sign text, a height for each line, and a vertical spacing between successive lines. The font provides the character shapes, the width of each character and the spacing between characters. As an optional feature, the operator may enter into the computer a forced line length for the line of text in which case the computer scales the character widths and spacing between characters.

Next, the operator may direct the computer to plot the sign on a web made of paper to check the appearance of the sign and, if he or she is dissatisfied, can enter new data into the computer to provide a different layout or appearance for the sign. After the operator becomes satisfied with the sign layout, he or she may substitute sign making stock and direct the computer to cause the tool to cut out the sign characters. Next, an operator may apply an adhesive sheet of clear plastic to the cut sign characters, after removing or weeding adjacent waste pieces, to extract the characters and to then apply them in the existing spaced relation to a sign base to provide a finished sign.

It has proven difficult and time consuming for many operators to select parameters to yield a finished sign in which the spacing between lines of text is balanced relative to the lines and to the surrounding margins, if any, and in which the interline spacing and margins also provide a desired level of the openness or tightness in the final sign appearance.

An automatic engraving apparatus previously known comprises an engraving tool, a drive assembly adapted for moving the tool and an engraving plate relative to one another in an X-Y plane corresponding to the shape of engraved characters or designs and a computer programmed to control the relative movements. According to one mode of operation, an operator enters into the computer the engraving plate size, the number of lines of text, the text per line, the line heights and optionally may set a margin size. Then, the computer automatically lays-out the sign according to the following algorithm. It first calculates upper, lower and side margin sizes as a fixed percentage of the plate height. Then if necessary it condenses each of the lines an equal percentage so that the longest line fits between the previously determined left and right margins. Next, the computer positions the top and bottom lines against the upper and lower margins, respectively, and equally spaces the other lines of text in the remaining area.

This layout does not always provide balance between the interline spacing and the margins because it ignores the need to provide space above and below each line proportional to the height of that line. Also, it is difficult to specify, without experimentation, the line height and margin parameters needed to yield an engraved plate with a desired level of openness.

Next, the layout in nonalphanumeric, blocked form is displayed on a CRT and the operator has an opportunity to alter the layout by programming the computer to independently expand or condense any one or all of the lines and also to independently change the vertical spacing between the lines of text. Because of the fixed plate sizes and number of variables, this is a time consuming and difficult process which often requires many iterations of trial and error and much operator expertise.

Accordingly, a general object of the present invention is to provide a sign making apparatus and related method which automatically lays-out a sign containing one or more lines of text based on operator selected line heights or other parameters to provide an aesthetically pleasing, balanced sign appearance.

Another general object is to provide the operator with the capability at the touch of a button to alter the spacing between lines of text and the size of margins in an aesthetically pleasing, balanced manner to make the sign appear more or less open as desired without the need to perform any calculations.

SUMMARY OF THE INVENTION

The invention resides in methods and apparatus for automatically laying-out a sign with the aid of a computer. An operator inputs to the computer information defining one or more lines of sign text including the height of each line. The computer determines a spacing between each pair of consecutive lines of text based on the heights of the two lines, if the sign consists of more than one line of text, and a spatial factor which is either determined by a computer program or selected by an operator. Using the heights of all of the lines, the spatial factor and top and bottom margin factors, the computer also calculates a suitable sign height and width and positions the line or lines of text to yield top, bottom and side margins which are balanced with respect to the lines of text. The size of the margins and the spacing between the lines of text are a function of the spatial factor which may be varied to vary the "openness" of the sign.

BRIEF DESCRIPTION OF THE FIGURES

FIG. 1 is a perspective view of a sign making apparatus embodying the invention.

FIG. 2 is a fragmentary vertical sectional view of the sign making apparatus of FIG. 1 showing a tool head and material feeding assembly.

DETAILED DESCRIPTION OF THE PREFERRED EMBODIMENT

Figure 3:
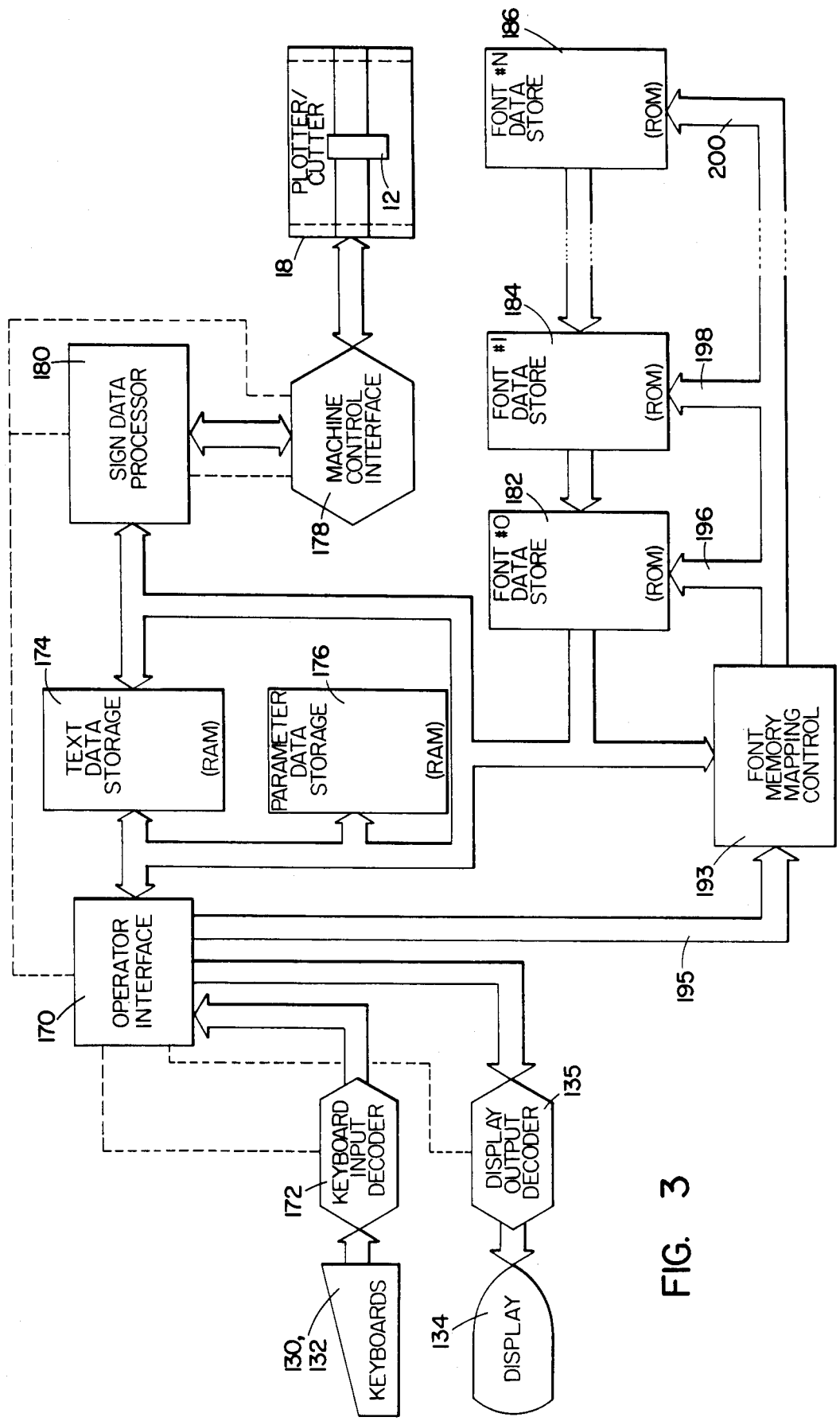
FIG. 3 is a block diagram illustrating components of electronic circuitry within a computer of the sign making apparatus of FIG. 1 used to layout a sign in accordance with the present invention.

FIG. 1 illustrates a sign making apparatus, generally designated 10, in which the invention is embodied. The apparatus 10 comprises a cutting and plotting machine 15 for plotting sign text on a web of plotting paper or the like or for cutting sign text from a web M of sign making material consisting, for example, of a colored layer of adhesive backed sheet vinyl releasably adhered to a paper carrier sheet. The apparatus 10 also includes a computer controller 11 having keyboards 130 and 132 for entering data relating to a desired sign, a microprocessor 180 (FIG. 3) for laying-out the sign text, in response to operator entered data and in accordance with the flow chart of FIG. 4, and an optional CRT or video monitor 13 for instructing the operator on how to use the system and for displaying a sign as layed-out by the microprocessor 180 and/or for displaying related sign data.

As shown in FIGS. 1 and 2 the cutting and plotting machine 15 comprises a cutting and plotting tool head 12 slidably mounted on a guide rail 14 for movement laterally of the web M in the Y-coordinate direction. The web M is fed longitudinally of itself, in the X-coordinate direction, under the cutting and plotting head 12 by means of a feed roller 20 having feed sprockets 22,22 at its opposite ends with teeth 23,23 for engaging corresponding sprocket holes in the web material M. Arcurately shaped guide clamps 28,28 and guide bars 38 and 41 hold the web against the sprockets.

The feed roller 20 is rotatably driven by means of a motor 80 controlled by command signals from the microprocessor 180. Combined movements of the tool head 12 laterally of the web and of the web material longitudinally of itself enable two dimensional characters and designs to be formed.

One material which may be used as the web material M is marketed under the brand name "Scotch Cal" by Three M Corporation and includes a vinyl sheet, supplied in various colors, having a thickness between 0.003 and 0.004 inches. This vinyl sheet has a pressure sensitive adhesive on its rear face and is releasably adhered to a silicone coated paper carrier sheet. The vinyl sheet is a thermoplastic material and therefore may be, as shown in FIG. 2, cut by a heated cutting stylus or blade 50 mounted in the tool head 12 which cuts completely through the vinyl to, but not through, the underlying carrier sheet in a sign cutting operation, the heat being provided by a body portion 46 of the tool head. The method of cutting is not however important to the invention and in other instances a sharp unheated knife may be used to cut the vinyl sheet. During plotting mode operations, a pen or pencil is installed within the body portion 46 in place of the stylus 50 and the heat is shut off.

Further details of the apparatus 10 antedating the present invention are illustrated and described in the aforementioned U.S. Pat. No. 4,467,525 to which reference may be made.

For the present purposes, it is sufficient to note that the sign making apparatus 10 includes circuitry and components schematically illustrated in FIG. 3. The keyboards 130,132 are decoded by a keyboard input decoder 172 which communicates with an operator interface 170. The operator interface also controls, if included, an optional CRT or similar visual display 134 via a display output decoder 135. Random access memory 174 stores data defining sign text. Another random access memory 176 stores other parameters relating to the sign. These are generally values entered by the operator through the keyboards 130, 132, but for some parameters the memory 176 also preferably stores a default or standard value which is used in the event no value is entered by the operator. The parameters include the height of each line of text, number of text lines, a spatial factor, and top and bottom margin factors. The parameters may also include forced sign dimensions (height and width) if specified by the operator, but if no sign dimensions are prescribed the system will automatically determine the dimensions as described in more detail below. Also, the parameters may include information defining a decorative border if one is to be provided.

A plurality of fonts 191,182,184 and 186 are provided to define the shape of alphanumeric characters available for the sign, a standard size for the characters and a standard spacing between the characters. An operator may select one of the fonts for use in producing a sign by a suitable entry into one of the keyboards 130,132 which causes the operator interface 170 to direct a font memory mapping control 193 to enable the desired font. The microprocessor 180 then accesses the enabled font via a communication bus 191. Based on the entered sign text data, the entered or permanently stored default values of the other sign parameters and the font data, the microprocessor 180 lays out a sign according to the flow chart of FIG. 4. Then, when instructed to do so, the microprocessor 180 commands a machine control interface 178 to direct the cutting and plotting machine 15 to either cut the laid-out sign on the web of sign making material M, or to plot it on a web of plotting paper substituted for the material M, or commands the display output decoder 135 to have the laid-out sign displayed on the display 134.

Figure 4:
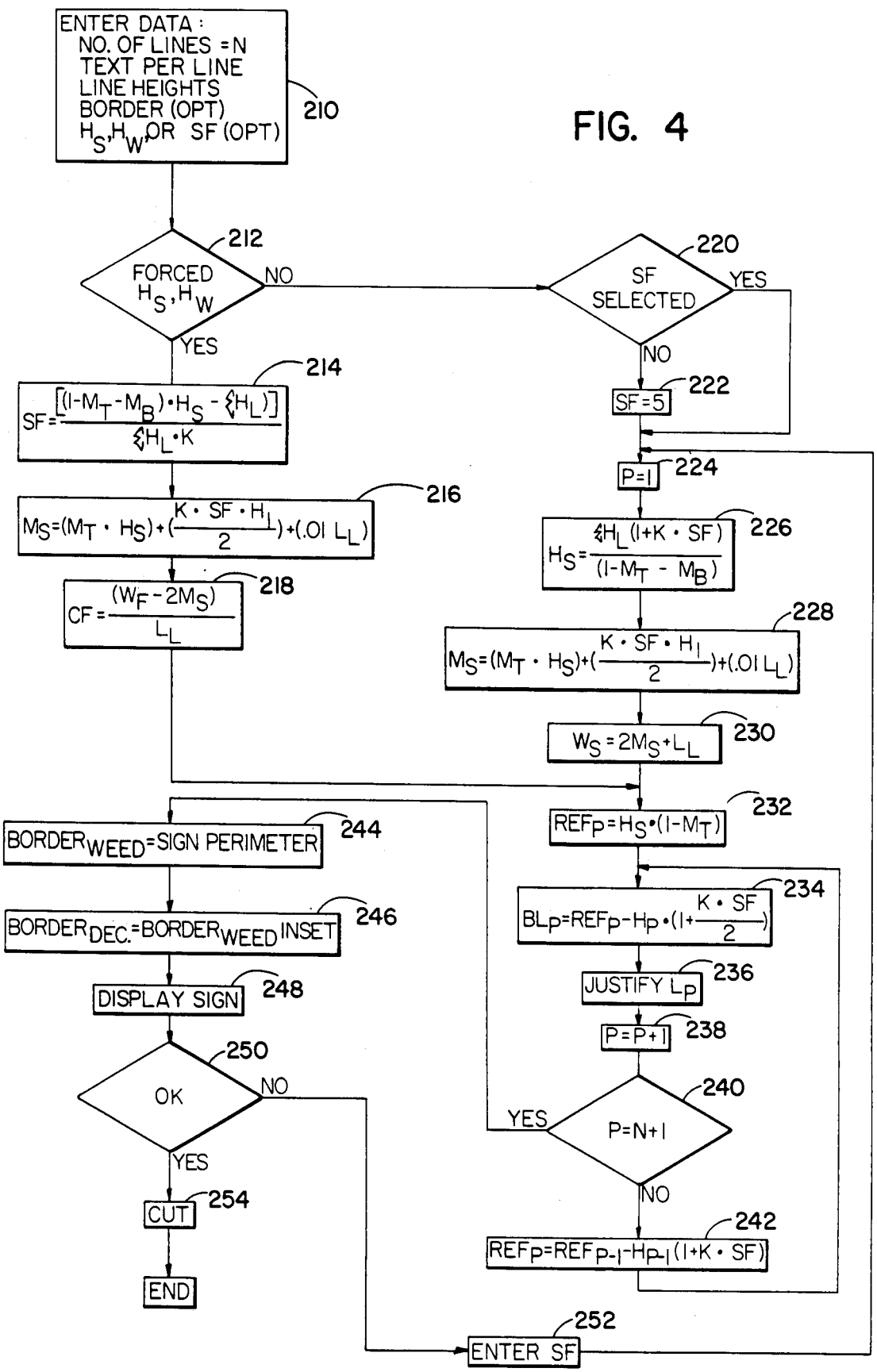
FIG. 4 is a flow chart illustrating one process for carrying out the present invention utilizing the circuitry of FIG. 3.

As illustrated in FIG. 4, the apparatus 10 is operated by first entering data into the computer 11 (step 210) via the keyboards 130,132 which data usually defines the number (N) of lines of sign text, the text of each line, the height of each line, and the desired degree of "openness" (spatial factor). The data may also optionally call for and define a decorative border and optionally define a forced sign height and a forced sign width.

Figure 5:
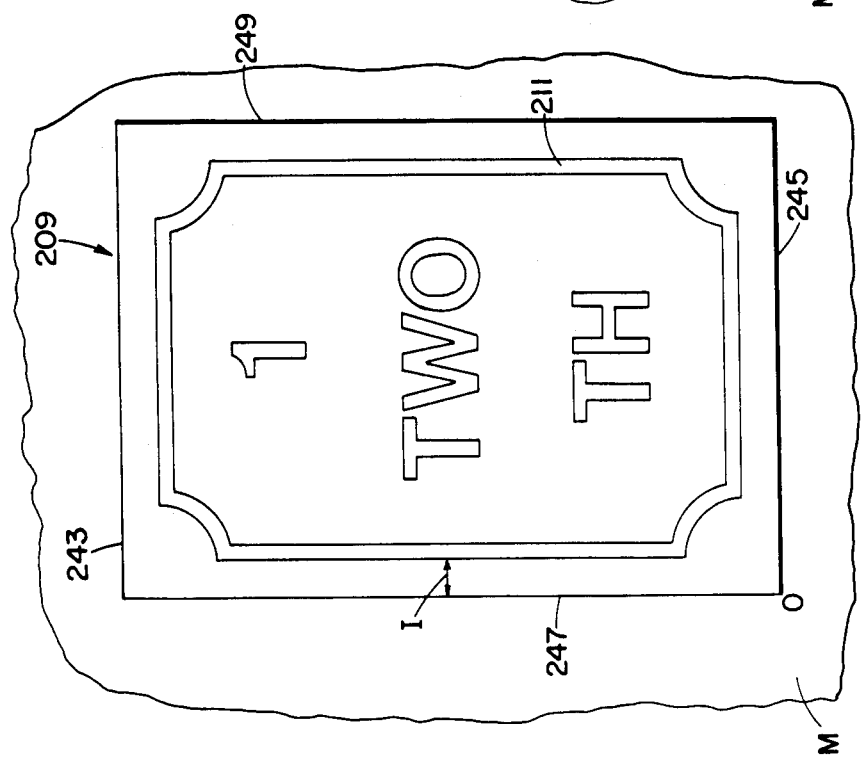
FIG. 5 illustrates a sign which has been laid out by the computer of FIG. 3 and having one level of openness.

A decorative border 211 is shown in FIG. 5 and comprises a generally rectangular band surrounding the sign text and having four straight side portions and arcuate corner portions. To define such a border, the operator enters into the computer 11 the border width, an inset value i, the radius of curvature of the arcuate corners and the polarity of the arcuate corners. The inset value i determines the distance I the outboard edge of each straight side portion of the border is to be spaced from the adjacent edge 243, 245, 247 or 249 of the sign, and if no inset value is prescribed by the operator the outboard edges of the straight border portions will be made to coincide with the edges 243, 245, 247 and 249. Negative polarity arcuate corners project into the sign area as shown in FIG. 5 and positive ones round out the corners.

Figure 6:
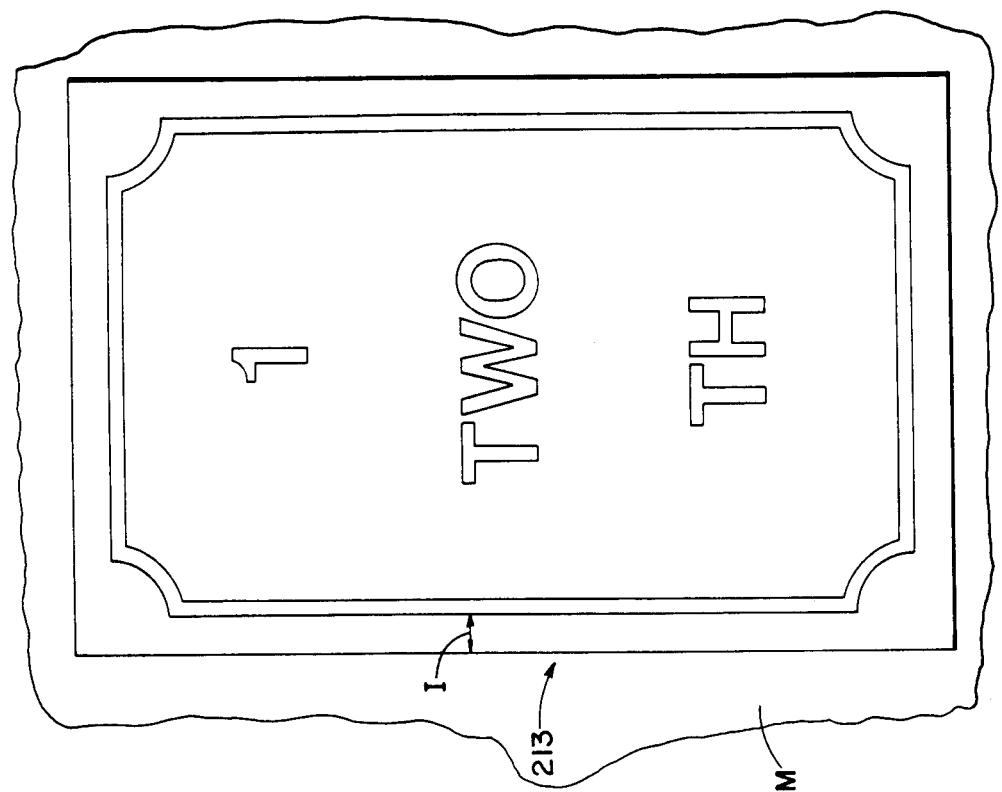
FIG. 6 illustrates a computer modified lay-out of the sign text of FIG. 5 with identically sized letters but having a more open configuration due to the preference of an operator expressed with a touch of a button on a keyboard associated with the computer of FIG. 3.

The computer 11 is programmed to produce sign layouts of different "openness" corresponding to the value of the spatial factor which may be selected to have any value within the range of 1 to 9, the higher the value of the spatial factor the more open the sign. As discussed below, the "openness" involves the spacing between lines of text and the size of the margins, if any, surrounding the text. The sign 209 of FIG. 5 has a spatial factor of 5, which is an average level of openness. The sign 213 of FIG. 6 has the same text and line heights as the sign 209 of FIG. 5, but also has a spatial factor of 8 giving it to a greater degree of openness. It should be noted that the spacing between lines of text and the sizes of the top, bottom, left and right margins of the sign 213 are significantly greater than those of the sign 209 and that the layout of each sign appears balanced despite the differences in interline spacing and margins. It should also be noted that the spacing between the letters within each line of text is the same in the signs 209 and 213, although this need not always be the case.

Figure 7:
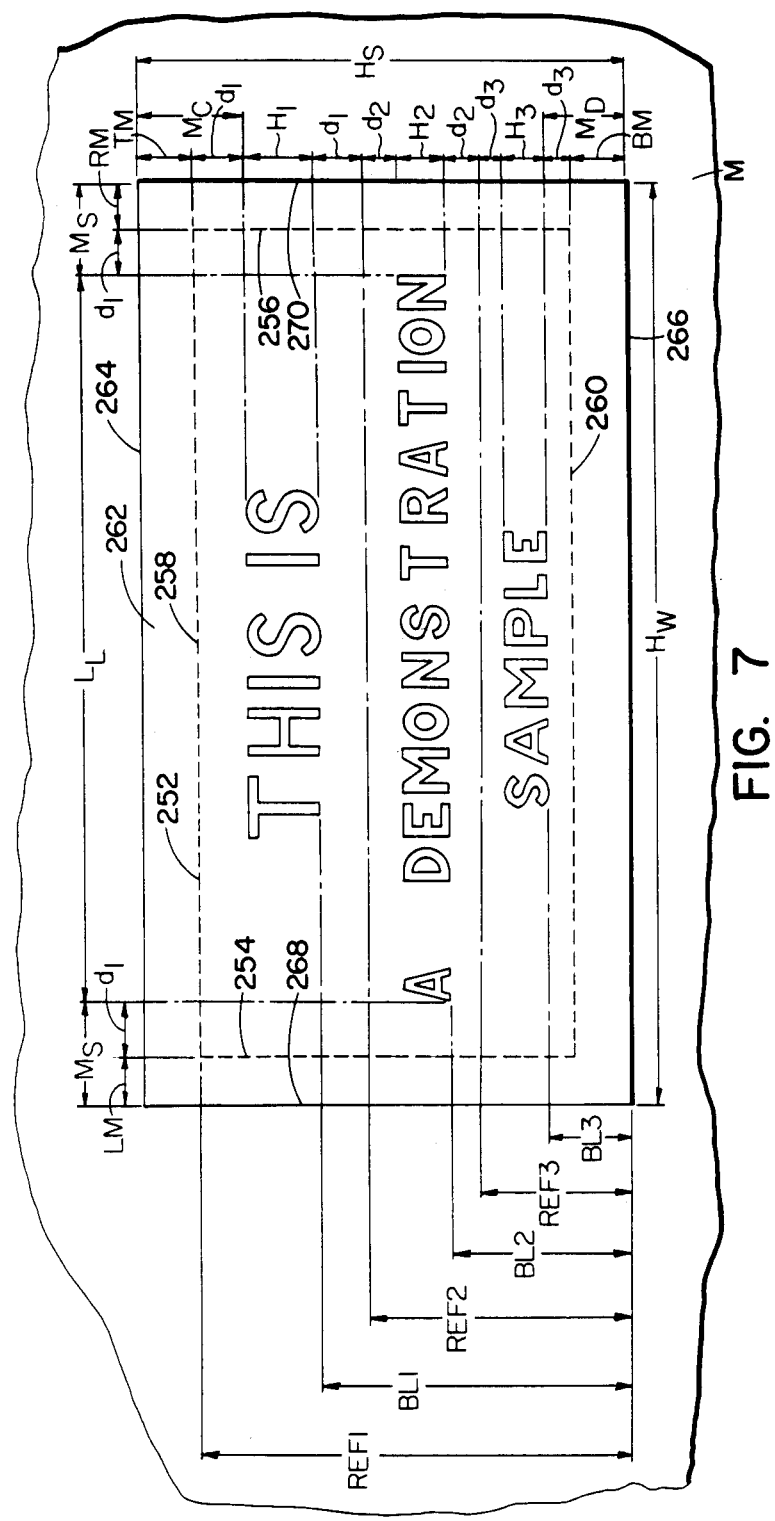
FIG. 7 illustrates another sign as laid-out by the computer of FIG. 3 and includes designations of quantities involved in the layout.

Before proceeding any further reference is made to FIG. 7 which illustrates various quantities used in the laying out of a sign by the computer of FIG. 3. As shown in this figure, the quantities $H_1$, $H_2$ and $H_3$ are the heights of the three illustrated lines of text. Associated with each line of text is a vertical space $d_k$ which appears both above and below the line, and where k is the number of the line. That is, the first line has a vertical space $d_1$ located both above and below it; the second line has a space $d_2$ located above and below it; and the third line has a space $d_3$ located both above and below it. The value or dimension of each vertical space $d_k$ is obtained by multiplying the height of the associated line by the spatial factor and dividing by 2. That is, for example:

$$d_1 = K \cdot SF \cdot H_1 / 2$$

where SF is the spatial factor and K is a rationalizing constant selected to allow the spatial factor to take on values between 1 and 9.

A core sign is indicated by the broken line rectangle 252 of FIG. 7 and consists of the rectangle engaging the extremities of the text surrounded on all four sides by a spacing d dependent on the height of one of the lines of text. Such spacing d may therefore be referred to as a line height dependent margin. Thus, the core sign is defined by a top horizontal line 258 spaced above the top of the top line of text by the spacing or line height dependent margin $d_1$ dependent on the height of the top line of text, by a bottom horizontal line 260 spaced below the bottom of the lower line of text by the spacing or line height dependent margin $d_3$ dependent on the height of the bottom line of text, and by two vertical lines 254 and 256 spaced from the ends of the longest line of text by the same spacing or line height dependent margin $d_1$ as appears above the top of the first line of text. The complete sign 662 is formed by adding to this core sign margins TM, BM, RM and LM dependent on the height $H_s$ of the sign. That is, a top sign height dependent margin TM is added to the top of the core sign, a bottom sign height dependent margin BM is added to the bottom of the core sign and right and left side sign height dependent margins RM and LM are added to the right and left hand edges of the core sign, thereby locating the top edge 264, the bottom edge 266 and the side edges 268 and 270.

From the foregoing it will be noted that the margin quantities are such that for each of the four sides of the sign there is a total margin or space between the related extremity of the text and the associated edge of the text, whereby:

total margin = line height dependent margin + sign height dependent margin

Therefore, in the example shown in FIG. 7:

total top margin $= M_c = d_1 + TM$ total bottom margin $= MD = d_3 + BM$ total right or left side margin $= M_S = d_1 + RM = d_1 + LM$ Should there be only one line of text, then both the top and bottom line height dependent margins will be $d_1$, dependent on the height of that one line.

The value of the top sign height dependent margin TM is obtained by multiplying the sign height $H_s$ by the top margin factor $M_T$. The value of the bottom margin BM is obtained by multiplying the sign height $H_s$ by the bottom sign height dependent margin factor $M_B$. The right and left side sign height dependent margins RM and LM are made equal to the top sign height dependent margin TM plus a small quantity dependent on the length of the longest line of text to give a more balanced appearance to the sign in the event it includes one or more relatively long lines of text. In particular:

$$RM = LM = TM + 0.01 L_L$$

where $L_L$ is the length of the longest line of text.

The total side margin $M_s$ which applies to both sides of the sign as shown in FIG. 7 is therefore described by the equation:

$$M_s = TM + d_1 + 0.01 L_L = (M_T H_s) + K \cdot SF \cdot H_1 / 2 + 0.01 L_L$$

Generally, the bottom margin factor $M_B$ is slightly greater than the top margin factor $M_T$ so that the bottom sign height dependent margin BM will be of a slightly greater vertical dimension than the top sign height dependent margin TM. The memory 176 stores standard values for the top and bottom margin factors $M_T$ and $M_B$ which are used in the event no other margin specifications are entered by the operator, but the system is set up so that the operator can enter additional data varying the margin factors, if desired.

Returning to FIG. 4, after the data is entered (step 210), the computer 11 reads the memory 176 to determine whether the operator has specified a forced sign height and sign width, (step 212). Assuming that the operator has not, the computer again checks the memory 176 to determine whether the operator has selected a spatial factor (step 220). If not, the computer utilizes the standard spatial factor of 5 (step 222). Next, the computer sets (step 224) a variable "P" equal to 1 which variable is used as discussed below to determine when the layout is complete. Then, the computer calculates (step 226) the overall height of the sign ($H_s$) according to the equation:

$$H_S = \Sigma H_L(1+K \cdot SF)/(1-M_T-M_B).$$

Where $\Sigma H_L$ represents the sum of the line heights, K is the rationalizing constant, for example 0.25, SF is the spatial factor, $M_T$ is the top margin factor, for example 0.1, and $M_B$ is the bottom margin factor, for example 0.125.

After determining the sign height, the computer proceeds (step 228) to determine the value $M_s$, relating to the side margins, in accordance with the equation given above.

Next, the computer calculates (step 230) the overall width of the sign which is simply twice the value $M_s$ plus the length of the longest line.

Then, the computer calculates (step 232) a first vertical axis reference level ($REF_1$) referred to the bottom edge 266 of the sign in accordance with the equation:

$$REF_1 = H \cdot (1-M_T)$$

This $REF_1$ level coincides with the top edge 258 of the core sign 252.

Next, the computer calculates (step 234) the vertical displacement ($BL_1$) of the bottom of the first line ($L_1$) of text above the bottom edge 266 according to the following equation $$BL_1 = REF_1 - H_1 \cdot (1+K \cdot SF/2)$$

Where $H_1$ equals the height of the first line of text. This equation indicates that the bottom of the first line is displaced downwardly from the core sign upper edge 252 by a distance equal to the height of the first line plus the height of the space $d_1$ provided above that line.

Next, the computer (step 236) justifies (left, right or center) the first line relative to the sign width. Then, the computer (step 238) increments the variable P by one and then compares (step 240) the present value of the variable P to the quantity N+1 where N is the number of text lines in the finished sign. In the FIG. 7 case where there are three lines of text, the variable P will not yet equal N+1 so that the computer proceeds (step 242) to determine the second reference level according to the equation:

$$REF_2 = REF_1 - H_1(1+K \cdot SF)$$

This equation indicates that the second reference level, $REF_2$, is displaced downwardly from $REF_1$ by an amount equal to the height of the first text line and the heights of the two spaces $d_1$ provided both above and below the first text line as shown in FIG. 7.

The computer then loops back to step 234 to determine the vertical position of the bottom of the second text line ($BL_2$). It then justifies the second text line $L_2$ (step 236), increments the variable P (step 238) and then compares the variable P to the quantity N+1. In the case of the example illustrated in FIG. 7, where N equals 3, the computer will then loop again through the steps 242, 234, and 236 utilizing P=3 and in doing so derive the quantities $REF_3$ and $BL_3$. It then increments the variable P in step 238. This causes P to equal N+1 in step 240 causing the computer to proceed to step 244 where it defines a weed border, by locating the four edges 264, 266, 268 and 270, which in the case of FIG. 7 is the sign perimeter based on the sign height $H_s$ and sign width $H_w$ calculated in the steps 226 and 230, respectively. In the subsequent cutting of the sign from the web M the vinyl layer of the web is cut along the weed border, that is along the four edges 264, 266, 268 and 270, as well as along the text characters. This separates the portion of the vinyl sheet located within the four edges from the remainder of the sheet and allows it to be removed from the carrier sheet to create a sign.

After defining the weed border in step 244 the computer proceeds to define the decorative border, if any, in step 246. The thickness of the decorative border and the shape of the corner portions were input in step 210 if a decorative border was desired. In step 210 the outboard edges of the straight portions of the decorative border are each spaced inwardly from the adjacent edge 264, 266, 268 or 270 by a dimension I dependent on the inset value i prescribed by the operator in step 210. In the case represented by FIGS. 5 and 6 this dimension I is independent of the openness factor, although this need not always be the case.

In the embodiment of FIG. 4 the computer 11 next (step 248) displays the sign on the display 13 so that the operator can decide (step 250) whether the sign is acceptable. In some implementations of the invention, however, a display device may not be provided in which case at this step the operator may have the computer plot the sign on a piece of paper to allow checking of its acceptability before cutting.

Returning again to step 250, if the operator is not satisfied with the sign as laid out at that time, he or she may enter into the keyboard 130 a spatial factor other than the previously utilized one. The computer 11 then loops back to step 224 to recompute another sign height (step 226), another left and right margin size (step 228) other reference levels (steps 232 and 242) and other positions locating the bottoms of the lines of text (step 234). After the computer 11 lays-out a sign using these values, the computer 11 then displays it on the display 13, or has it plotted on paper, for viewing and approval by the operator. If the operator is again dissatisfied, the above process may be repeated until an acceptable sign layout is achieved.

Going back to steps 210 and 21, if the operator had entered into the computer 11 data defining a forced sign height and sign width, then the computer proceeds to calculate a corresponding spatial factor which provides a balance of spacing between lines of text and top, bottom and side margins according to the following equation (step 214):

$$SF = [(1-M_t-M_B) \cdot H_S - \Sigma H_L]/(\Sigma H_L \cdot K)$$

Where $H_S$ equals the forced sign height previously entered into the computer 11 by the operator and the other factors are as noted above. Next, the computer 11 determines the side margins $M_s$ (step 216) in the manner illustrated in step 228 using the forced sign height. Then, the computer calculates (step 218) a compression factor, CF, used to compress or elongate (as the case may be) the longest line from its standard length $L_L$ to a length adapted to the forced sign width and sign margins, the equation used being:

$$CF = (W_F - 2M_S)/L_L$$

Where WF equals the forced width of the sign. The compression factor, CF, is used to compress or elongate each of the lines of text so that each line is compressed or elongated by an identical proportion. Also, in its use it laterally compresses or elongates each character of the sign text as well as the spaces between the characters.

Next, the computer performs the steps 232-254 as described above. Although the spatial factor is a derived quantity in the forced sign height and forced sign width mode of operation, nevertheless the vertical positions $BL_p$ of the bottoms of the various lines are balanced relative to the top and bottom margins and the side margins calculated in step 216 so that the resulting sign has a pleasing balance between line spacing and margin size similar to the balance appearing in a sign resulting from a nonforced height and nonforced width mode of operation. Also, after a sign layout resulting from a forced sign height and forced sign width is displayed in step 248, the operator has the opportunity to reject the sign (step 250) and enter another spatial factor (step 225), in which case the computer abandons the forced sign height and width restraints and the spatial factor calculated in step 214.

By the foregoing, sign making apparatus and methods for laying-out a sign have been disclosed by way of a preferred embodiment. However, numerous substitutions and modifications may be made by a person skilled in the art without deviating from the scope of the invention.

We claim:

1. A method for laying out a sign, said method comprising the steps of:
   designating characters for first and second consecutive lines of sign text,
   designating a height for each of said first and second lines of the sign text,
   providing a spatial factor which corresponds to a general level of openness of the sign, and
   spacing said first and second lines from one another by a spacing which is a function of the heights of said first and second lines of text and of said spatial factor.

2. A method as set forth in claim 1 wherein:
   said step of spacing said first and second lines of text comprises calculating a first spacing $d_1$ which is dependent on the height of the first of said lines,
   calculating a second spacing $d_2$ which is dependent on the height of the second of said lines, and
   spacing said first and second lines from each other by a distance equal to the sum of said first spacing $d_1$ and said second spacing $d_2$.

3. A method as defined in claim 1 wherein:
   said step of providing a spatial factor is performed by selecting a spatial factor from a group of available spatial factors each of which corresponds to a different general level of openness of the sign.

4. A method for laying out a sign, said method comprising the steps of:
   designating characters for at least one line of sign text,
   designating a height for each of said lines of sign text,
   providing a spatial factor which corresponds to a general level of openness of the sign, and
   spacing said lines of text from one another (if more than one line has been designated), providing a top margin above the top of the first of said lines of text, and providing a bottom margin below the bottom of the bottom one of said lines of text, the size of said top and bottom margins and of the spacing between said lines of text being a function of said spatial factor.

5. A method for laying out a sign as defined in claim 4 and including the further step of
   providing a right side margin adjacent the right hand end of the longest one of said lines of text, and providing a left side margin adjacent the left hand end of said longest one of said lines of text, the size of said right and left side margins being a function of said spatial factor.

6. A method for laying out a sign as defined in claim 4 wherein:
   the size of said right and left side margins is also a function of the length of said longest line of text.

7. A method as defined in claim 4 wherein:
   said step of providing a spatial factor is performed by selecting a spatial factor from a group of available spatial factors each of which corresponds to a different general level of openness of the sign.

8. A method for laying out a sign, said method comprising the steps of:
   designating the characters for N consecutive lines of sign text where N equals one or any other positive integer,
   designating a height for each of said N lines of sign text,
   providing a spatial factor which corresponds to a general level of openness of the sign,
   calculating a spacing $d_k$ for each line which is dependent on the height of that line and on said spatial factor,
   spacing consecutive ones of said lines (if more than one line has been designated) from one another by a distance equal to the sum of the spacing $d_k$ associated with one of said lines and the spacing $d_{k+1}$ associated with the next of said lines,
   providing a top margin factor $M_T$ and a bottom margin factor $M_B$,
   calculating a sign height $H_s$ which is dependent on the sum of the heights of said lines, on said spatial factor and on said top and bottom margin factors,
   calculating a top sign height dependent margin TM as a function of said sign height $H_s$ and said top margin factor $M_T$,
   calculating a bottom sign height dependent margin BM as a function of said sign height $H_s$ and said bottom margin factor $M_B$,
   locating a top edge of said sign above the top of the first line of text by a spacing $M_c$ equal to the sum of the spacing $d_1$ associated with said first line of text and said top sign height dependent margin TM, and
   locating a bottom edge of said sign below the bottom of the last of said lines of text by a spacing $M_D$ equal to the sum of the spacing $d_N$ associated with said last line of text and said bottom sign height dependent margin BM.

9. A method as set forth in claim 8 wherein:
   said spacing $d_k$ is calculated by the formula $$d_k = k \cdot SF \cdot H_k / 2$$

wherein SF is the spatial factor and K is a rationalizing factor permitting the spatial factor to take on a convenient range of values.

10. A method as set forth in claim 8 wherein said sign height is evaluated in accordance with the equation:

$$H_S = \Sigma H_L (1 + K \cdot SF) / (1 - M_T - M_B)$$

where $\Sigma H_L$ is the sum of the line heights, SF is the spatial factor, and K is a rationalizing factor permitting the spatial factor SF to take on a convenient range of values.

11. A method as set forth in claim 10 and including the further steps of:
calculating a right side sign height dependent margin RM as a function of said sign height $H_S$ and of said top margin factor $M_T$,
calculating a left side sign height dependent margin LM as a function of said sign height $H_S$ and of said top margin factor $M_T$,
locating a right side edge of said sign by spacing it from the right hand end of the longest one of said lines of text by a spacing equal to the sum of the spacing $d_1$ associated with said first line of text and said right side sign height dependent margin RM, and
locating a left side edge of said sign by spacing it from the left hand end of the longest one of said lines of text by a spacing equal to the sum $d_1$ associated with said first line of text and said left side sign height dependent margin LM.

12. A method as set forth in claim 11 wherein:
said right side sign height dependent margin RM and said left side sign height dependent margin LM are equal to each other.

13. A method as set forth in claim 12 wherein:
said right side sign height dependent margin RM and said left side sign height dependent margin LM are also each a function of said length of said longest line of text.

14. A method as set forth in claim 13 wherein:
said top sign height dependent margin is calculated in accordance with the formula $$TM = H_S \cdot M_T,$$

and,
said bottom sign height dependent margin is calculated in accordance with the formula $$BM = H_S \cdot M_B,$$

and,
said right side and left side sign height dependent margins is calculated in accordance with the formula $$RM = LM = TM + cL_L$$

where $L_L$ is said length of said longest line of text and c is a proportionalizing factor.

15. A method as set forth in claim 10 wherein:
said top sign height dependent margin is calculated in accordance with the formula $$TM = H_S \cdot M_T$$

and,
said bottom sign height dependent margin is calculated in accordance with the formula $$BM = H_S \cdot M_B.$$

16. A method as defined in claim 8 wherein:
said step of providing a spatial factor is performed by 17. A method for laying out a sign, said method comprising the steps of:
designating characters for a plurality of lines of sign text,
designating a height for each of said plurality of lines of sign text,
providing top and bottom margin factors,
providing a spatial factor which corresponds to a general level of openness of the sign,
computing a spacing between each pair of successive ones of said lines of sign text as a function of the heights of said pair of lines and of said spatial factor, and
computing a sign height as a function of the sum of the heights of said lines, of said spatial factor and of said top and bottom margin factors.

18. A method as defined in claim 17 wherein:
said step of providing a spatial factor is performed by selecting a spatial factor from a group of available spatial factors each of which corresponds to a different general level of openness of the sign.

19. A method for laying out a sign, said method comprising the steps of:
designating characters for a plurality lines of sign text,
providing a spatial factor,
designating a height for each of said lines of text,
calculating a vertical space to appear above and below each of said lines of text as a function of said spatial factor and the height of said line of text, and
spacing said lines from one another so that the total vertical distance between the bottom of one line and the top of the line next below it is equal to the sum of the vertical space calculated to appear below said one line and the vertical space calculated to appear above said next below line.

20. A method as set forth in claim 19 wherein said spatial factor is selected by an operator.

21. A method as set forth in claim 19 further comprising the steps of:
providing top and bottom margin factors,
calculating a total sign height as a function of the sum of the heights of said lines of text, of said spatial factor and of said top and bottom margin factors.

22. A method for laying out a sign as set forth in claim 21 and including the further step of:
calculating a total sign width as a function of the length of the longest one of said lines of text, of said spatial factor and of one of said top and bottom margin factors.

23. A method as defined in claim 19 wherein:
said step of providing a spatial factor is performed by selecting a spatial factor from a group of available spatial factors each of which corresponds to a different general level of openness of the sign.

24. An apparatus for laying-out a sign, said apparatus comprising:
input means for entering a plurality of lines of text and a height for each of said lines,
means providing a spatial factor, and
computer means for determining the spacing between a pair of successive ones of said lines as a function of the heights of the two lines of said pair and of said spatial factor.

25. An apparatus for laying-out a sign, said apparatus comprising:
input means for entering at least one line of text and a height for each of said lines,
memory means providing a spatial factor, a top margin factor and a bottom margin factor, and computer means coupled to said input means and to said memory means for automatically determining as a function of the heights of said lines and of said spatial factor the spacing between successive ones of said lines (if more than one line has been entered), for automatically determining as a function of the heights of said lines, of said spatial factor and of said top margin factor a top margin to appear above the top one of said lines, and for automatically determining as a function of the heights of said lines, of said spatial factor and of said bottom margin factor a bottom margin to appear below the bottom one of said lines.

26. An apparatus as defined in claim 25 wherein said computer means also automatically determines right and left side margins appearing respectively adjacent the right hand end and left hand end of the longest one of said lines of text as a function of the heights of said lines of text, of said spatial factor and of one of said top and bottom margin factors.

* * * * *